United States Patent [19]
Sapp

[11] Patent Number: 5,105,344
[45] Date of Patent: Apr. 14, 1992

[54] OUTDOOR LANTERN

[76] Inventor: Everett E. Sapp, 1620 E. 19th St., Owensboro, Ky. 42303

[21] Appl. No.: 695,986

[22] Filed: May 6, 1991

[51] Int. Cl.$^5$ ............................................. F21V 9/00
[52] U.S. Cl. .................................. 362/166; 362/180; 362/312
[58] Field of Search ............... 362/163, 166, 167, 168, 362/169, 180, 312, 313, 182, 266, 293

[56] References Cited
U.S. PATENT DOCUMENTS 866,242  9/1907  Vinton ................................. 362/167
4,393,439  7/1983  James, Jr. ........................... 362/182

*Primary Examiner*—Stephen F. Husar
*Attorney, Agent, or Firm*—Warren D. Flackbert

[57] ABSTRACT

An improved outdoor lantern which presents a yellow tinted sleeve to cast a color serving to repel insects normally attracted to bright lights after dusk. The sleeve is made from glass and is readily adaptable to various types or forms of lanterns and may be offered as replacement for existing lanterns or as original equipment on new lanterns. The use of the glass sleeve of the invention reduces the need for costly chemical repellants and insecticides.

4 Claims, 1 Drawing Sheet

OUTDOOR LANTERN

BACKGROUND OF THE INVENTION

As is known, the usage of outdoor lanterns is extensive, particularly in the instances of camping, hunting, fishing, and the like, or wherever outdoor nighttime activities are involved. A significant nuisance occasioned by the preceding is the presence of annoying pests attracted to bright lights after dark and haphazardly flitting and buzzing around the lantern. The resulting annoyance is typically minimized through the use of chemical repellants and insecticides, where the cost of such is a noticeable factor.

DESCRIPTION OF THE INVENTION

The invention overcomes the described troubles by, in simple form, presenting a yellow glass sleeve for placement on existing lanterns or as original equipment on new lanterns and, importantly, readily fitting over the body of numerous forms of lanterns. Thus, use of the invention significantly enhances enjoyment of nighttime outdoor activities.

DESCRIPTION OF THE FIGURES

A better understanding of the invention will become more apparent from the following description, taken in conjunction with the accompanying drawing, wherein.

Figure 1:
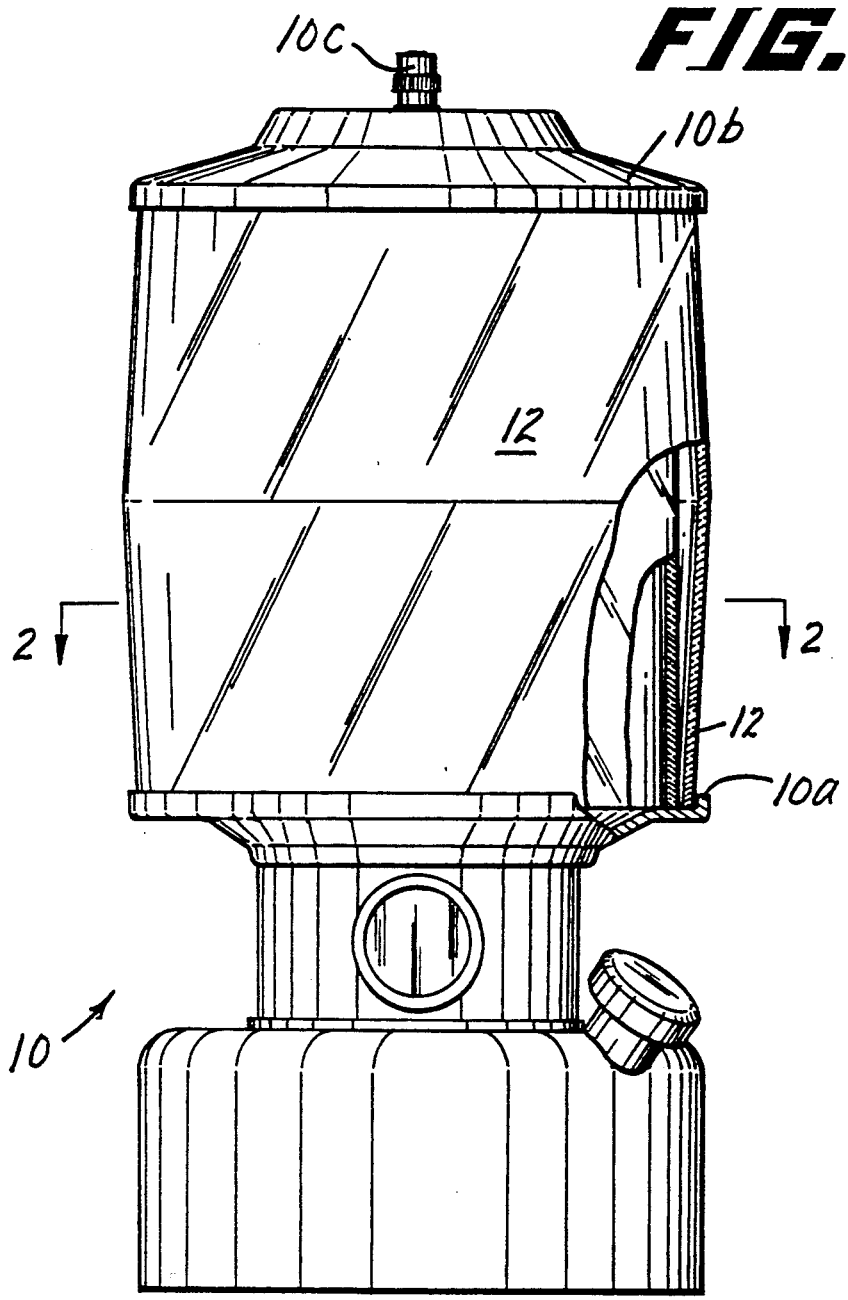
FIG. 1 is a view in elevation showing a conventional outdoor lantern utilizing a yellow (not apparent) glass sleeve in accordance with the teachings of the present invention; and, FIG. 2 is a view in horizontal section, taken at line 2—2 on FIG. 1 and looking in the direction of the arrows, still further detailing the invention usage of such figure.

For the purposes of promoting an understanding of the principals of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

DESCRIPTION OF THE PREFERRED EMBODIMENT

Referring now to the figures, the improved outdoor lantern presented by the invention employs, as stated heretofore, a glass sleeve 12 tinted to a yellow color. The sleeve 12 is adapted for use with virtually any type of outdoor lantern 10, requiring, by way of example, a support, as by rim 10a (see FIG. 1).

As evident, the sleeve 12 fits over the body of outdoor lantern 10, measuring, in a typical embodiment, a height of approximately 8" to 10". The sleeve 12 is produced from a tempered glass and an insect repellant substance may be incorporated into the glass.

Figure 2:
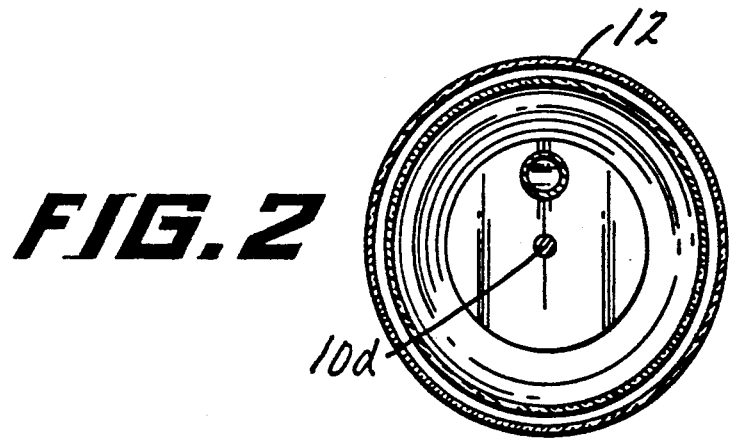

It might be noted that the lantern 10 of FIG. 1 typically includes a reservoir, for fuel, in the base area and a fuel entry. The superstructure is common in presentation, terminating in a lid 10b positioned by a decorative knob 10c threadedly received on a centrally disposed shaft 10d (see FIG. 2). Typically, the aforesaid lid 10 also serves to position the yellow tinted sleeve 12 of the invention, i.e. such overlays the upper free edge thereof.

In any event, and emphasized once again, the invention serves to effectively repel insects attracted to bright lights after darkness; ends the nuisance of annoying pests flitting and buzzing around; reduces the need for costly repellants and insecticides; and, enhances the enjoyment of nighttime outdoor activities, such as camping, hunting, fishing, and the like.

The improved lantern described above is susceptible to various changes within the spirit of the invention, including, by way of example, proportioning; glass thickness; surface configuration; overall shape; and, the like. Thus, the preceding description should be considered illustrative and not as limiting the scope of the following claims.

I claim:

1. An outdoor lantern including a body portion having a base and a source of fuel comprising a yellow glass sleeve peripherally arranged on said base of said body portion, and means retaining said yellow glass sleeve in position on said base of said body portion, where said yellow glass sleeve includes an insect repellant substance incorporated therein, and where said yellow glass sleeve is universal in configuration to accommodate a variety of outdoor lanterns.

2. The outdoor lantern of claim 1 where said means is a peripheral rim on said base of said body portion, and where said yellow glass sleeve is received within the confines of said peripheral rim.

3. The outdoor lantern of claim 1 where said means also includes a lid overlaying said yellow glass sleeve serving to confine longitudinal movement thereof.

4. The outdoor lantern of claim 3 where threaded means secure said lid in an assembled relationship with respect to said base of said body portion.

* * * * *